United States Patent [19]
Schaeff

[11] 3,716,249
[45] Feb. 13, 1973

[54] ARRANGEMENT FOR STABILIZING TRAILING VEHICLE AXLES

[75] Inventor: Friedrich Schaeff, Bensheim-Auerbach, Germany

[73] Assignee: Sauer, Otto Achsenfabrik, Keilberg uber Aschaffenburg, Germany

[22] Filed: Sept. 9, 1970

[21] Appl. No.: 70,675

[30] Foreign Application Priority Data

Sept. 9, 1969 Germany.................P 19 45 589.1

[52] U.S. Cl. ..............................................280/81 A
[51] Int. Cl. ............................................B62d 15/00
[58] Field of Search.........280/81 A, 81 R, 80 R, 445, 280/446, DIG. 1, 124 F; 188/196; 303/10, 11; 92/101

[56] References Cited

UNITED STATES PATENTS

| | | | |
|---|---|---|---|
| 3,051,506 | 8/1962 | Stump et al. | 280/81 |
| 2,952,474 | 9/1960 | Gouirand | 280/81 |
| 2,690,916 | 10/1954 | Gilliam | 280/81 |
| 2,890,063 | 6/1959 | Stover | 280/81 |
| 3,047,306 | 7/1962 | Easton | 280/81 |
| 3,502,003 | 3/1970 | Dobrikin et al. | 92/101 |

FOREIGN PATENTS OR APPLICATIONS

| | | | |
|---|---|---|---|
| 446,957 | 3/1949 | Italy | 280/81 |
| 692,487 | 7/1965 | Italy | 280/81 |

*Primary Examiner*—Kenneth H. Betts
*Attorney*—Edwin E. Greigg

[57] ABSTRACT

A trailing vehicle axle having telescopic piston rods connecting the steering knuckles with the pistons of pneumatic cylinders, the pistons during straight-ahead motion holding the wheels in fixed position subject to the air pressure. In a turn, one piston rod lengthens telescopically without effort and the other enters the cylinder against the air pressure.

4 Claims, 6 Drawing Figures

ARRANGEMENT FOR STABILIZING TRAILING VEHICLE AXLES

FIELD OF THE INVENTION

The invention relates to an arrangement for stabilizing the trailing axles of vehicles including trailers and semi-trailers.

BACKGROUND OF THE INVENTION

It is known to provide in a vehicle pneumatically operated stabilizing elements inserted between a fixed part of an axle and a part thereof participating in turning movements.

The turning movement of such a trailing axle is brought about by lateral forces acting on the wheels.

If the loading and also the roll resistance of both the wheels of the axle are about the same, the lateral forces are enough to bring about correct tracking. However, if the wheel loads are unequal, as during a turn, then the lateral forces, which depend on the loading and the roll resistance of the wheels, are also unequal and cause a lateral deviation of the axle. Irregularities in the road surface and imperfect balancing of the wheels also cause lateral forces and make the wheels tend to deviate or to oscillate.

In the Published German Pat. application No. 1,811,769, there is described an arrangement for balancing out this type of disturbance by generating a force opposing the deviation by means of stirrup-shaped levers acting on the tracking rod of the steering axles or steering knuckles. There are also stabilizing devices in which one of the parts that turn relative to each other, such as the part fixed to the vehicle, is provided with a heavy cam and the other part with a pressure member, the cam and the pressure member being held in pressure engagement and exerting an opposing force owing to a resolution into components at the point of pressure. The resolution into components is brought about by the direction and the force of mutual pressure relative to the corresponding inclination of the cam curve, which is dependent on the angle of deviation.

SUMMARY OF THE INVENTION

The stabilizing arrangement to be described below is simpler and less costly than the known ones and affords the possibility of adjusting the trailing axle in a simple manner in normal position corresponding to straight-ahead motion.

The arrangement according to the invention is characterized by a stabilizing element for each of the turning directions, comprising an air pressure cylinder having a telescoping piston rod, the wheels of the axle during straight-ahead motion being fixed in neutral position by pressure engagement of the pistons in the terminal position thereof in the cylinders.

The telescoping rod is directly connected to a movable part of the axle. The pivot point of the piston rod and the cylinder being attached to mutually movable parts, the rod must change its position in response to a turning movement. Owing to the telescopic construction, a shortening of the rod causes the piston to penetrate into the cylinder and there is therefore no effective shortening relative to the length corresponding to straight-ahead motion. On the other hand, the rod can lengthen without effort and the piston is then held in terminal position by the air pressure. Threads are provided on the piston rods for adjusting the trailing axle without play. The pressure cylinders may be conventional pneumatic brake cylinders.

The arrangement of the invention has the advantage of simplicity of construction and of operation.

BRIEF DESCRIPTION OF THE DRAWING

The invention will be described in more detail with reference to embodiments thereof shown on the drawing, which is on scale and in accordance with standard conventions, so that only a brief description thereof will be necessary.

DESCRIPTION OF EMBODIMENT

Figure 1:
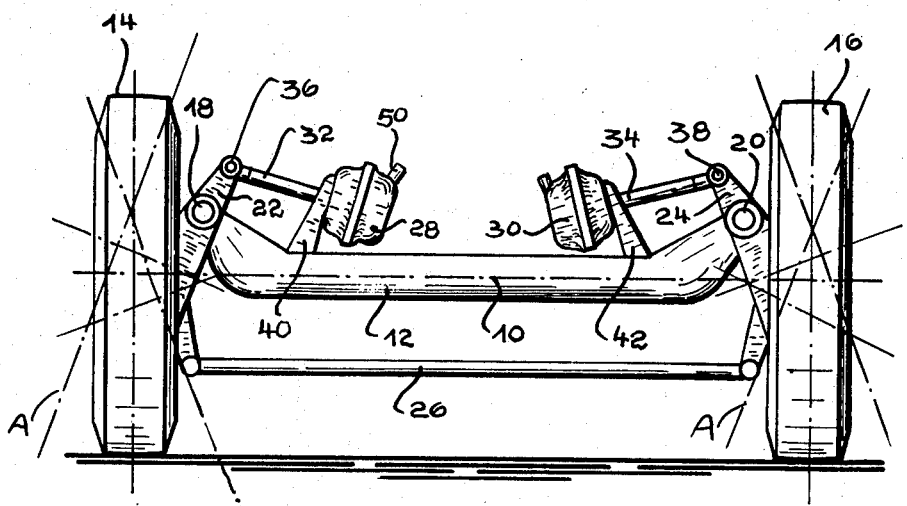
FIG. 1 is a plan view of a vehicle trailing axle in normal position with a stabilizing arrangement according to the invention.

In FIG. 1, the housing 12 of the trailing axle of a vehicle extends in the direction of the geometric axis 10, which is also the axis of rotation of the wheels 14 and 16 when traveling straight ahead. The outer or terminal sections of axle housing 12 are bent forwardly, as is known per se, and support at 18 and 20 the journal links for the steering knuckles 22 and 24. Apart from a possible toe-in, the wheels are always parallel to each other, this being assured in well-known manner with the aid of the cross tie 26. In this arrangement, the axle housing 12 is fixedly attached to the fixed part of the vehicle, i.e. with the chassis. The other parts, such as wheels, steering knuckles and cross tie, participate in the turning or returning movements. Between the two groups of parts, there is inserted a stabilizing device, which in the present instance comprises a pair of air pressure cylinders 28 and 30 with telescopic rods 32 and 34.

Figure 3:
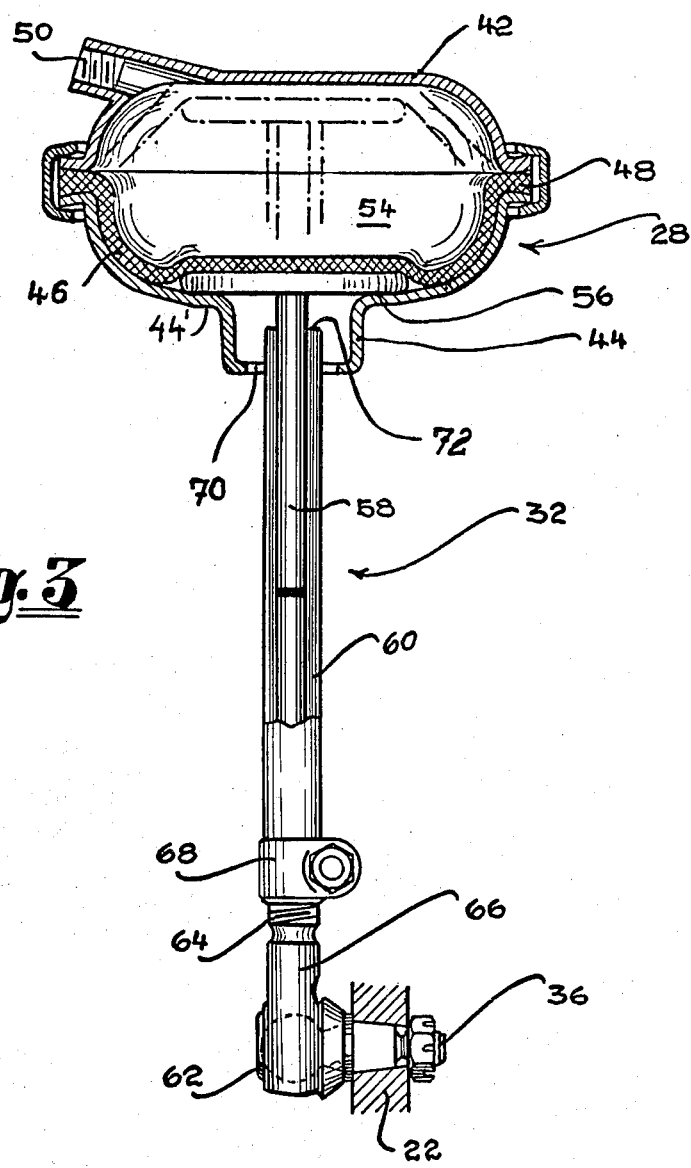
FIG. 3 is a lateral view in partial longitudinal section of a stabilizing cylinder with its piston rod.

The construction of the stabilizing elements 28, 32 and 30, 34 is shown in FIG. 3. If the wheels turn to the position A of FIG. 1, which refers to the planes of symmetry and of rotation thereof, the distance between the supporting bracket 40 of cylinder 28 and the pivot point 36 between rod 32 and steering knuckle 22 must become shorter, and the distance between the supporting bracket 42 of cylinder 30 and the pivot point 38 between rod 34 and steering knuckle 24 must become longer. The unit composed of the pressure cylinder and the telescopic rod is now constructed so as to make the lengthening possible without transmission of a force in the longitudinal direction of the rod, whereas the shortening takes place against the pressure of the cylinder. Accordingly, in comparison with the neutral position corresponding to straight-ahead traveling, only one of the two cylinders is in operation at any moment.

Cylinder 28 is equal to cylinder 30 and telescopic rod 32 is equal to rod 34. The same combination of cylinders and telescopic rods is used in the bogie arrangement according to FIG. 2 and it is therefore sufficient to describe cylinder 28 and rod 32 of FIG. 1.

Cylinder 28 is a conventional brake cylinder of a pneumatic brake installation. Between the two halves 42 and 44 of the housing, a rubber diaphragm 48 is tensioned and fixed in position in conventional manner. The outer housing half 42 has a connecting tube 50, through which the pressure side of diaphragm 48 is supplied with air under pressure. Preferably, the air pressure in this space is regulated in accordance with the existing load conditions so as to be increased in dependence on an increase in wheel loading, in axle loading or in the overall vehicle load. In a vehicle with pneumatic springing, the cylinders of this novel stabilizing device may be advantageously pneumatically connected to the springing system. There are known pneumatic cushioning systems (usually designated in the art as "air suspensions") in which the cushioning bellows of the wheels at one side of the vehicle are pneumatically isolated from the cushioning bellows at the other side of the vehicle. In such an arrangement it may be of advantage to have access to a pair of separate stabilizing cylinders, as in the present arrangement, since it is then possible to connect each of the stabilizing cylinders with only one of the pneumatic systems.

The other housing half or section 44 is fixed to a portion of one of the two constructional units which are mutually angularly displaced when a turning or returning movement occurs. For instance, in FIG. 1, housing section 44 is connected to journal bracket 40 and therefore also with axle 12 by means of bolts 52 shown in FIG. 3.

The air pressure in the chamber 54 of the cylinder causes diaphragm 46 to be permanently pressed against the bottom of a piston 56, shown here for simplicity as having a substantially flat shape. The rod 58 of the piston is telescopically guided in a tube 60. The two parts 58 and 60 together form the telescopic rod or pressure rod 32. Rod 32 is pivotally connected at 36 by means of a ball joint 62 to steering knuckle 22, as is apparent from FIG. 1. Between joint 62 and tube 60 there is inserted an adjusting device for varying the effective length of the tube. To this end, the tube is screwed to a greater or lesser extent onto a thread 64 of a joint bolt 66 and held in position by means of a clamping sleeve 68 mounted thereon. The technical details of this adjustment device are of well-known type, as is apparent from the drawing.

The housing portion 44 has an integral annular part 44', the inner wall face of which serves as an abutment for the piston 56 to limit its travel directed outwardly from the chamber 54. In such a position of the piston 56 (as shown in solid lines in FIG. 3), the membrane 46 is fully extended and is, in this condition, rigidly supported by the part 44' of the housing portion 44.

Rod 32 extends through a wide aperture 70 into housing section 44. Since, under normal conditions, points 62 and 52 are not only linearly removed from each other when a turn is entered into, but also an angular movement takes place, it is necessary for rod 32 to be capable of angular movement relative to the plane of attachment of the diaphragm. To this end, aperture 70 must be correspondingly wide.

The two rods 32 and 34 are adjusted with the aid of the adjusting devices such as 64, 66, 68 in such a way that in the neutral position corresponding to straight-ahead travel, the end face 72 of tube 60 just contacts piston 56 without any play therebetween. If external forces tend to extend the rod-cylinder system, 32, 28, the system follows without opposing it, because end face 72 moves away from piston 56 and the piston is held in this position against the air pressure by means of the stops or the like referred to above, which are not shown in the drawing. On the other hand, if the external forces attempt to shorten the system 28, 32, this is possible only by means of a pressure of end face 72 of tube 60 against piston 56 and against the pressure in chamber 54. Under the influence of such external forces, the piston and the diaphragm are pushed into cylinder 28 up to the terminal position shown in dash-dot lines in FIG. 3, possibly with more or less of an angular movement. If the volume of cylinder 28 is closed or if the total volume communicating with chamber 54 is not large relative to the volume of chamber 54, the force required to push piston 56 into the chamber increases with continuing movement, and the return force is therefore then dependent on the angular deviation of the wheels in a progressive manner.

As was pointed out above, the pistons of both cylinders are in their terminal positions when the vehicle moves straight ahead and they are pushed by the air pressure into contact with the stops provided in the cylinder housing. Upon a turning movement of the axles, the piston of the corresponding cylinder is pushed by the push rod into the cylinder against the pressure of the air supplied thereto and exerts a corresponding return force on the wheel, at the same time as the other cylinder is passive and exerts no force. The air pressure supplied to the stabilizing cylinder is controlled in dependence on the loading of the wheels by means of pneumatic controls of conventional type. There is therefore always alternatively one or the other cylinder in operation according to the direction of the turn, left or right.

Figure 2:
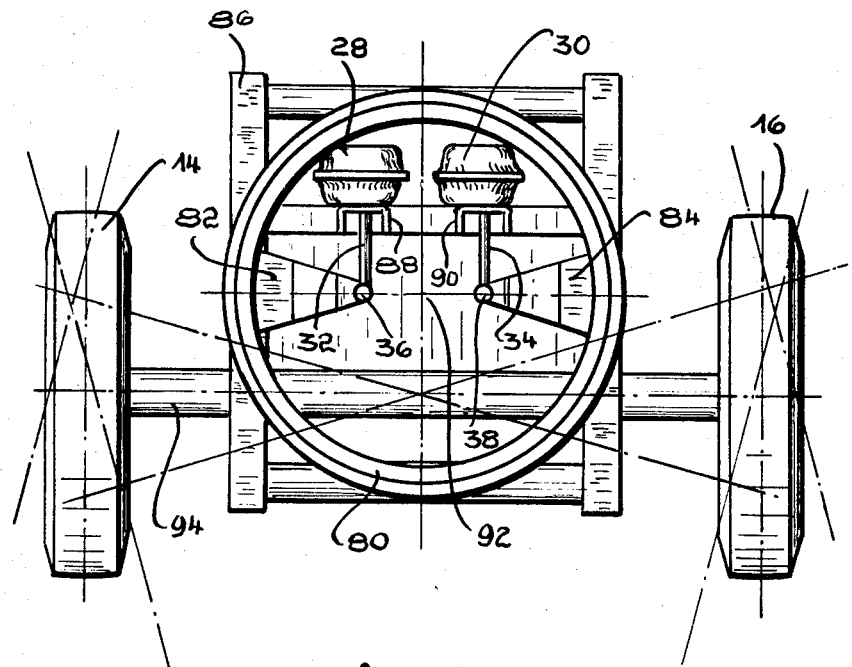
FIG. 2 is a view corresponding to FIG. 1 of a bogie tracking device incorporating the invention.

As is shown in FIG. 2, a system corresponding to the cylinders and rod system 28–34 can also be provided on a bogie. FIG. 2 shows a fifth wheel bogie arrangement of a semi-trailer. Instead of the fifth wheel, such a bogie may also have a pivot pair journaling arrangement. In the embodiment shown, numeral 80 designates a ball-bearing mounted fifth wheel, which is affixed to the vehicle chassis and has a 1 of arms 82 and 84 extending symmetrically part of the way to the center of the wheel. The underlying wheel supporting the wheel axle is fastened to an auxiliary frame 86, which also takes part in the turning movements. Fixedly attached to the auxiliary frame by means of brackets 88 and 90 are pneumatic pressure cylinders 28 and 30 similar to the corresponding cylinders of FIG. 1. As in FIG. 1, the cylinders are connected with telescopic rods 32 and 34 and the pivot points of these rods at the arms 82 and 84 correspond to those of FIG.

1 and are similarly designated 36 and 38. The center 92 of the fifth wheel is preferably displaced relative to the geometric axis 94 of the road wheels and in the case of an axle which trails a fixed axle, the displacement should preferably be in the direction of travel.

The operation of the arrangement of FIG. 2 corresponds completely to that explained in connection with FIG. 1, and does not require further explanation.

Figure 4:
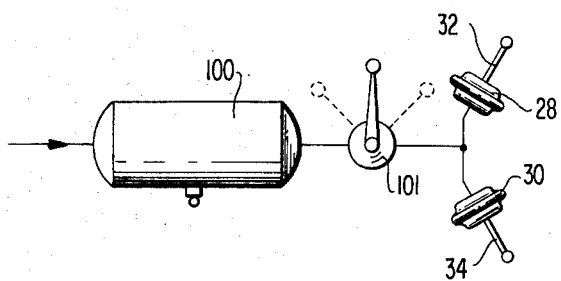
FIG. 4 is a schematic illustration of the stabilizing elements according to the invention coupled to a manually operable control valve.
Figure 5:
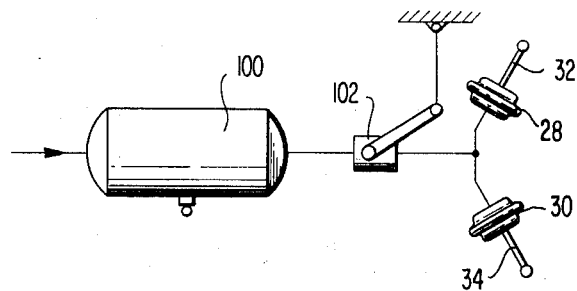
FIG. 5 is a schematic illustration of the stabilizing elements according to the invention coupled to a conventional load-controlled levelling valve for varying the pressure in said stabilizing elements in a load-dependent manner.
Figure 6:
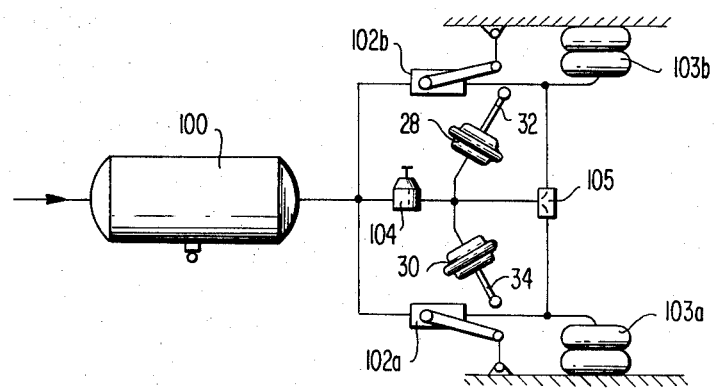
FIG. 6 is a schematic illustration of a conventional load-dependent air spring suspension means combined with the stabilizing elements according to the invention to vary the pressure in the latter as a function of load.

As indicated earlier in the specification, the pressure prevailing in the stabilizing elements 28, 32 and 30, 34, is preferably regulated as a function of the vehicle load. In FIGS. 4, 5 and 6 there are schematically illustrated three simple examples of such control.

Turning now to FIG. 4, there is illustrated a pneumatic pressure source 100 which is in communication with the pneumatic cylinders 28 and 30 through a hand-operated valve 101 which is operable to furnish different pressures to said cylinders under "full load", "half load" or "no load" conditions.

In FIG. 5 a pneumatic pressure source 100 is connected to the pneumatic cylinders 28 and 30 through a levelling valve 102 which is adjusted automatically as a function of the vehicle load. In this manner the pressure in the cylinders 28, 30 is varied automatically in a load-dependent manner.

A further development of the load-dependent automatic pressure control is illustrated in FIG. 6. A pressure source 100 supplies conventional air spring suspensions 103a and 103b (one associated with each vehicle side) with pneumatic pressure in a load-dependent manner by virtue of respective levelling valves 102a and 102b. The pressure source is also connected to the cylinders 28 and 30 through a pressure reducing valve 104 ensuring a minimum pressure therein. The downstream side of each levelling valve 102a, 102b is connected through a shuttle valve 105 to the cylinders 28, 30 to cause therein a load-dependent pressure variation.

That which is claimed is:

1. An arrangement for stabilizing a trailing vehicle axle having, on each side of the vehicle, (a) stationary parts and (b) moving parts participating in the turning movements of the vehicle wheels, comprising a separate stabilizing element for each of the two turning directions of said axle, each said stabilizing element connecting stationary parts with moving parts and operating opposed to one another, each said stabilizing element having A. a pneumatic cylinder,
   B. means for supplying a fluid pressure medium to said cylinder,
   C. a piston disposed in said cylinder and exposed to the pressure prevailing in said cylinder,
   D. a piston rod affixed to said piston and formed of at least two parts in telescoping relationship with one another, said piston rod being biased outwardly by said pressure and
   E. abutment means on said piston rod for determining the maximum collapsed state thereof, said abutment means being individually so adjusted on each piston rod that during straight-line travel of the vehicle both piston rods are in said maximum collapsed state, whereby during a turning movement of said vehicle wheels the piston rod associated with the one turning direction undergoes free telescopic extension, while simultaneously, the piston rod associated with the other turning direction moves its associated piston into its cylinder against the pressure prevailing therein.

2. An arrangement as defined in claim 1, wherein said pneumatic cylinder includes
   A. a housing and
   B. a diaphragm secured within said housing and extending thereacross to define with a portion of said housing an expansible chamber in which said pressure prevails, said piston being affixed to said diaphragm.

3. Arrangement according to claim 1, comprising means for increasing the pressure supplied to said cylinders in response to an increased loading of said vehicle.

4. An arrangement as defined in claim 3, wherein said vehicle includes separate air spring suspension means associated with the two sides of the vehicle, the pressure in each air spring being a function of load conditions, the air spring suspension means associated with one vehicle side being in pneumatic communication with one of said stabilizing elements and the air spring suspension means associated with the other vehicle side being in pneumatic communication with the other of said stabilizing elements; the pressure prevailing in each stabilizing element varying in the same sense as the pressure prevailing in the associated air spring suspension means.

* * * * *